UNITED STATES PATENT OFFICE.

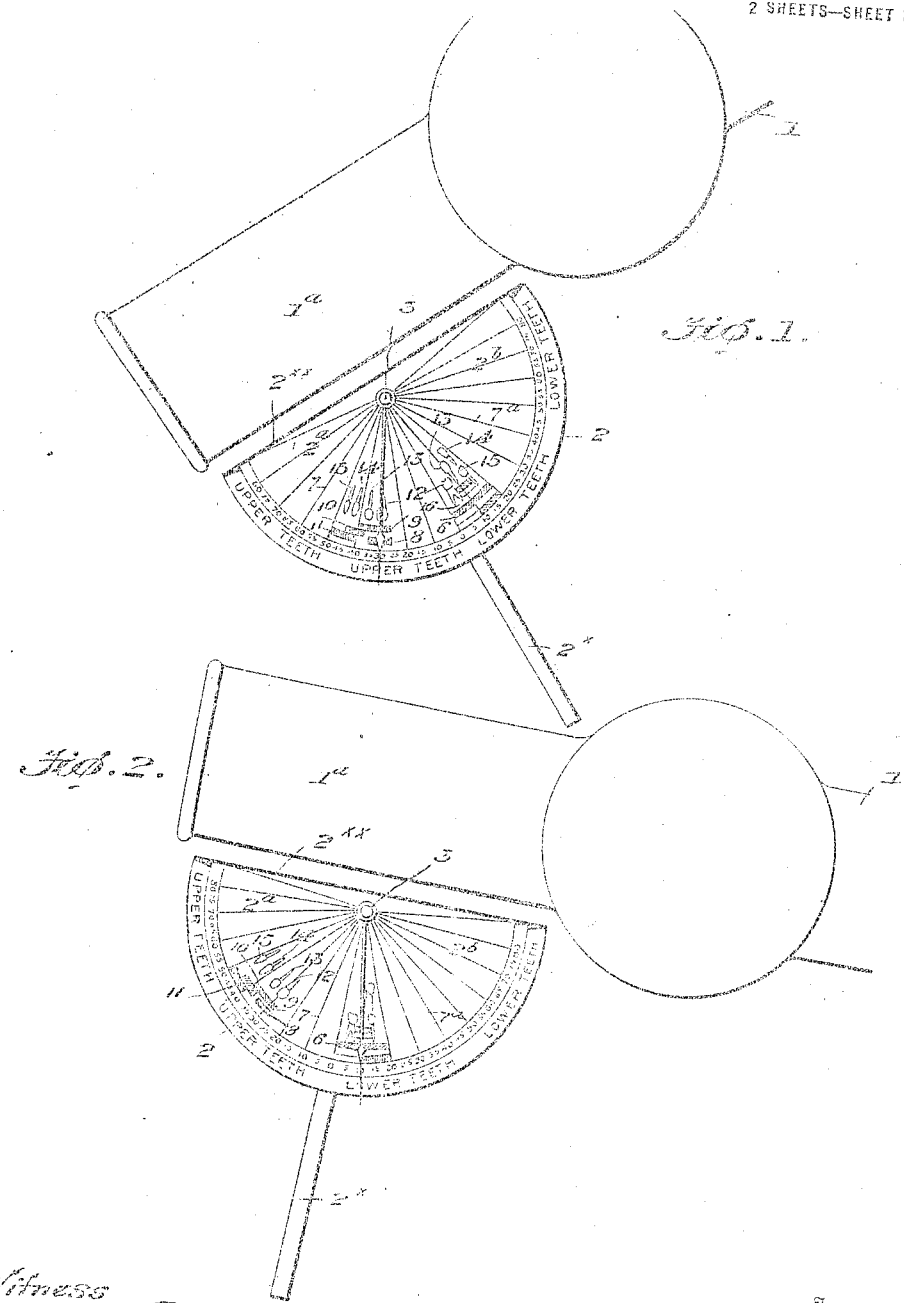

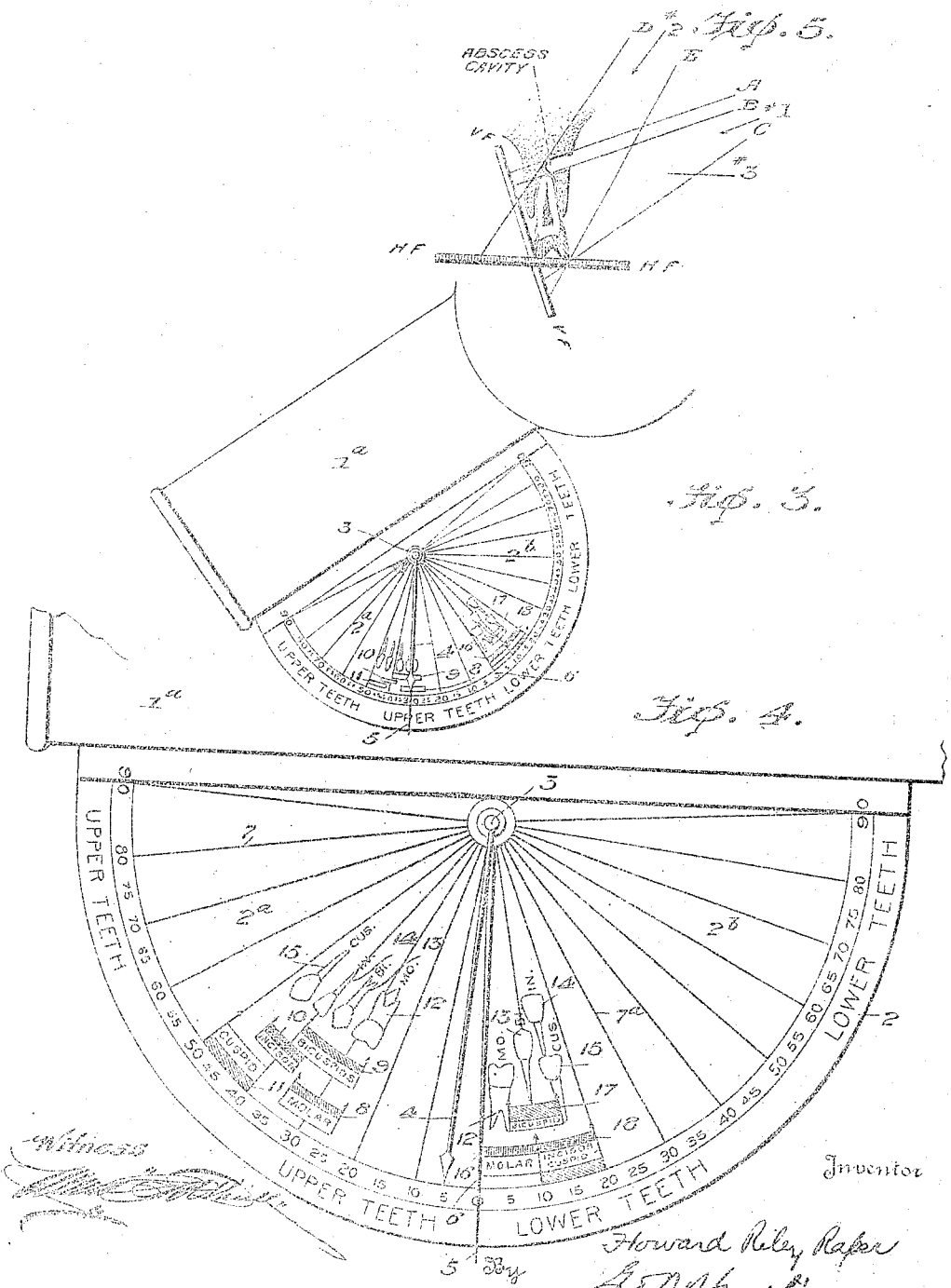

HOWARD RILEY RAPER, OF ALBUQUERQUE, NEW MEXICO.

X-RAY ANGLE INDICATOR.

1,408,778. Specification of Letters Patent. Patented Mar. 7, 1922.

Application filed January 3, 1921. Serial No. 434,775.

*To all whom it may concern:*

Be it known that I, HOWARD RILEY RAPER, a citizen of the United States, residing at Albuquerque, in the county of Bernalillo and State of New Mexico, have invented certain new and useful Improvements in X-Ray Angle Indicators, of which the following is a specification.

This invention relates to an X-ray angle indicator for use on X-ray machines to automatically show the angle at which the X-ray tube is inclined to the horizontal, and is particularly adapted to inform the operator of the correct range of angles for inclining the X-ray tube in dental radiography, although useful in radiography of any part of the cranium and the body wherever it is necessary to incline the tube to a predetermined angle to obtain the desired result.

As my invention has particular usefulness in dental radiography it is hereinafter described as adapted for that purpose; but it is to be understood that the specific disclosure and explanation in that connection is not to be deemed as restricting the application of the invention to that branch of radiography alone. It is to be understood, however, that one branch of the invention is specific to dental radiography, to-wit, the chart or dial which I have invented based on much research work and many experiments, which has angles and indicia by which the operator of the X-ray machine may accurately predetermine the angle to the horizontal at which the cone and tube of the machine should be set to obtain a radiograph of any particular tooth, whether molar, cuspid, bicuspid or incisor, and on either the upper or lower jaw, which will accurately disclose the conditions prevailing at that particular tooth and thus enable diagnoses, within reasonable limitations of accuracy, to be obtained.

This chart or dial is set forth and claimed in my application Serial No. 434774, filed Jan. 3, 1921.

In respect to the other branch of my invention, that having to do with the use of the angle indicator in connection with, or carried by, an X-ray tube, a pointer, and a plumb, and disregarding the special dental indicia, the invention has a wider range of usefulness than in dental radiography as it enables the X-ray tube to be properly inclined to make radiographs of the cranium and any desired part of the body.

The art of radiography involves the principles of casting shadows, towit, a source of light, and object, and a screen or surface on which the shadow falls. In dental X-ray work, the X-ray tube corresponds to the source of light, the tooth and the contiguous parts to the object, and the surface of the film to the screen on which the shadow is cast.

Depending on the relationship existing between the light, the object and the surface, a shadow may assume the true form of the object, or, it may assume a fantastic, distorted form thereof. It therefore becomes necessary in order to obtain a true shadow, to establish a correct relationship between the light, the object and the surface.

In dental radiography the teeth and contiguous parts and the film are not subject to extreme variation of position. The difficulty of obtaining radiographs which truly disclose the condition of a given tooth and contiguous parts is to properly locate and incline the X-ray tube. If the head of the patient is placed so that the roots of the teeth are substantially vertical and the film is placed in the mouth so that it presses against the tissues close to the teeth, two of the material factors have been taken care of. The third factor is the adjustment of the X-ray tube in correct position to obtain the correct radiographic image.

Heretofore the operator of the X-ray machine has depended solely upon judgment or natural aptitude or intuition for the proper angular arrangement of the tube to meet any given condition and object as to whether a true or distorted radiograph is desired. For, it will be understood that distortion, i. e., elongation of the picture to a moderate degree, sometimes affords a better view of certain disease conditions than a true picture would disclose and which foreshortening would completely obscure. Some operators obtain a picture of the ends of the roots at the expense of good reproduction of the balance of the teeth, while others obtain good pictures of the teeth and yet appear unable to catch the end of the root on the film. Other operators appear unable to approximate the proper angle for any given tooth.

From the foregoing, and a wide variety of other causes, dental radiography has not heretofore insured inclusion in the radiograph of all conditions prevailing at the tooth or teeth receiving attention.

My invention accomplishes two purposes: First, it automatically indicates the exact angle to the horizontal at which the X-ray tube is set, whether it be inclined upwardly or downwardly; and second, it furnishes instant information to the dental radiographer of the ranges or limits of angles which must not be exceeded in making a radiograph of any given tooth, whether molar, cuspid, bicuspid or incisor on either the upper or lower jaw, if an accurate representation of conditions is to be obtained. The invention therefore leaves little to the judgment or intuition or "sense" of position on the part of the operator, and saves time, service, and expense in this class of work.

The present invention may be embodied in hand-carried or portable form, or, attached to the tube of an X-ray machine or otherwise arranged. In whatever embodiment it assumes, there is a plumb-pointer which automatically indicates the angle at which the X-ray tube is inclined. There is also a settable pointer or hand which may be moved to the predetermined angle-marking or indication on the dial or chart to afford a guide for quickly determining the proper position for the plumb-pointer.

The disclosure of the invention hereinafter given is, therefore, to be considered as illustrative of the invention and not in limitation of the scope thereof or the utilization of the essential principles involved.

In the accompanying drawings:—

Fig. 1 is a detail view of a hand-carried or portable form of the invention shown in position as being applied to the cone or cylinder of the tube of an X-ray apparatus, illustrating the downward inclination thereof at an angle of 30° as would be the case when an upper molar was being radiographed.

Fig. 2 is a similar view showing the cone inclined upwardly at an angle of 10°, as would be the case when a lower bicuspid was being radiographed.

Fig. 3 is a view of a modification where the dial or chart is attached to the X-ray tube or cylinder, the latter being inclined downwardly at an angle of 30°.

Fig. 4 is an enlarged view of the dial used on both forms of the invention shown in the preceding figures, the plumb being swung to one side to show that it is independent of the pointer; and Fig. 5 is a diagram of an upper bicuspid and two films, illustrating the necessity for inclination of the X-ray tube at the proper angle.

In Fig. 1 I have shown part of an X-ray tube 1 having cone 1ª. My invention may be portable, or, carried by the bottom, side, or top of the cone 1ª of the tube. In the particular embodiment of the invention illustrated in Figs. 1, 2 of the drawings, the X-ray indicator is in the form of a portable device which is held in the operator's hand. It may, however, be attached to the cone or cylinder in any desired or preferred manner, as shown, for instance, in Figs. 3 and 4.

A dial 2 in the form of a semi-disk, carries indicia which is the result of numerous experiments and much research work on my part. When the invention is embodied in portable form, as disclosed in Figs. 1 and 2, the dial 2 may be provided with a handle 2ˣ which is grasped by the operator. The dial may, however, be carried by a supporting stand, or by a bracket on the X-ray apparatus. This dial, when attached to the cone 1ª, as shown in Figs. 3 and 4, is in effect, a part of the X-ray tube and is adapted to be moved up and down, or laterally, with the tube. In any embodiment of the invention the dial may be opaque or transparent. Pivoted to the dial at the same point, which is indicated by 3, are a plumb 4 and a settable pointer 5. Either or both of these may be of some distinctive color, if desired. The plumb 4 always maintains a vertical position and by its relationship to the lines and indicia on the dial 2, indicates to the operator the angle to which the tube 1 is tilted, either upwardly or downwardly. The settable pointer 5 is frictionally held at the pivot 3 to a degree sufficient to maintain it in any position to which it may be swung. It is a simple matter to set the pointer 5 to the proper position on the dial 2 and then swing the tube 1 until the pointer 5 coincides with the plumb 4.

The dial 2 has a zero line 6 which is at right angles to the longitudinal axis of the tube 1 and cone 1ª. Consequently when the plumb 4 coincides with the line 6, the tube 1 and cone 1ª are precisely horizontal. The dial 2 comprises two quadrants 2ª, 2ᵇ, on opposite sides of the zero line 6. The quadrant 2ª is laid out and marked as a guide for radiographing upper teeth. The quadrant 2ᵇ is laid out and marked as a guide for radiographing lower teeth.

By research and experiment I have discovered that there are certain ranges or limits of angular disposition of the X-ray tube within which the operator must keep when radiographing molars, bicuspids, incisors and cuspids on the upper jaw and that entirely different ranges of angles must be observed when taking X-ray pictures of molars, bicuspids, incisors and cuspids on the lower jaw. These angles are as follows:

*Upper teeth.*

Upper incisors, from 35° to 45° above the horizontal.

Cuspids, from 40° to 50° above the horizontal.

Bicuspids, from 25° to 40° above the horizontal.

Molars, from 25° to 35° above the horizontal.

*Lower teeth.*

Incisors and cuspids, from 10° to 20° below the horizontal.

Lower bicuspids, from 5° to 15° below the horizontal.

Lower molars, from 0° (i. e. the horizontal) to 10° below the horizontal.

Failure to obtain accurate and complete radiographs will result if these limits are not observed. Undoubtedly the failure of operators to obtain proper radiographs of any given tooth has been the result of lack of knowledge of the proper angle (within a given range) at which the X-ray tube should be inclined. So far as I am aware, I am the first to invent means, in the form of a chart, dial, or other disclosure, which presents this information to the radiographer, whether in the form of a dial or chart alone, or a dial or chart used in connection with an indicating device which automatically, so to speak, discloses the fact that the tube is at the proper angle for the taking of a radiograph of a particular tooth.

Radiating from the point 3 of the dial on the quadrants $2^a$ and $2^b$, respectively, are lines 7, $7^a$, indicating the different angles, each line being provided with the angle designation, as 10, 20, 30, etc.

The word "molar" is provided on the dial between the angles representing the limits of inclination of the tube 1 for X-raying a molar. For instance, on the quadrant $2^a$ the word "molar" runs from the angle line 25 to the angle line 35 for upper teeth. Similarly, as the proper range of angular disposition for bicuspids is between 25° and 40° for upper teeth, the word "bicuspids" is provided and comprehended between the angle lines 25 and 40 on the quadrant $2^a$. The word "incisors" appears between the angle lines 35 and 45 for upper teeth. The word "cuspids" appears between the angle lines 40 and 50 for upper teeth on quadrant $2^a$.

To further assist the operator colors may be employed in the form of markings corresponding to the ranges between angles. For instance, a red band 8 represents the range of angles for taking radiographs for molars; a green band 9, the range for bicuspids; a yellow band 10, the range for incisors; and a blue band 11, the range for cuspids.

As a further aid to the operator, pictures of the different teeth may be provided as shown at 12, 13, 14, 15.

The same plan of indication and identification heretofore described for the quadrant $2^a$ is carried out on the quadrant $2^b$ which represents angles for lower teeth. Here the molars are represented as between 0 and 10. The bicuspids as between 5 and 15; the incisors and cuspids as between 10 and 20. The same color markings as above described, for instance, a red band 16 represents the range for molars; a green band 17, the range for bicuspids; and a yellow 18, the range for incisors and cuspids.

Certain conditions are met with in X-ray dental work where there is a malformation or tipping of the teeth. The dial 2 may be provided with indicia representing proper angles at which the tube 1 should be set to meet such conditions, if desired, although this is not shown.

I have ascertained by research that the following angles for the tube 1 should be observed:

Lower molars tipped away to the lingual: 10° above the horizontal.

For extra-oral lateral dental radiographs: 65° to 75° above the horizontal.

Upper teeth with the film placed horizontally in the mouth: about 60° above the horizontal.

Upper molars when the vault is very high: as low as 20°.

If these angles are observed, about 90% of cases will be properly radiographed; but in extreme malposition of teeth, extreme angles are required.

The angles hereinbefore given are based on the assumption that the patient's head will be so placed that the teeth will be disposed substantially vertically.

My invention has to do, more particularly, with the inclination of the X-ray tube for vertical angles. The invention does not lend itself to the determination of horizontal angles, but as successful dental radiography depends largely on the correct determination of vertical angles, the invention provides means for insuring successful radiographs in a very high percentage of cases.

Assuming, by way of illustration, that an upper molar is to be radiographed and that 30° (midway between the limits 25° and 35°) is the angle to which the tube 1 is to be set, this indication appearing on quadrant $2^a$ where the word "molar" and the red band 8 appear, the operator immediately moves the pointer 5 to the 30° point. Knowing the particular tooth which is to be radiographed, the operator's eye naturally seeks the word, color and tooth representation on the dial 2.

When the portable form shown in Figs. 1 and 2 is used, the device is positioned underneath or alongside the cone $1^a$ in such manner that the straight edge $2^{xx}$ is against the cone or tube or assumes a position in alignment with the longitudinal axis thereof. The tube being tilted until the plumb 4 aligns with the pointer 5, it is known that the tube is at the proper degree of inclination for radiographing the particular tooth in question. In Figs. 1 and 2 the device is shown as being applied to the tube or cone.

When the angle meter is attached to the cone 1ª, by any suitable means as in Figs. 3 and 4, and the pointer 5 having been set to the 30° mark, if the tube is tilted downwardly until the pointer 5 aligns with the plumb 4, it is known that the tube is at the proper degree of inclination.

In both forms of the invention the indication is automatically registered.

According to whether the tooth to be radiographed is on the upper or lower jaw, the tube 1 must be tilted downwardly or upwardly and brought to the proper predetermined angle, as the case may be.

VF, is a film placed in a more or less vertical position in the mouth. HF, is a film placed horizontally in the mouth. The abscess cavity will register between lines A and B when the X-rays are directed through the parts as indicated by arrow No. 1. But the abscess cavity will not show when the X-rays are directed through the parts as indicated by arrow No. 2. The placing of the film in the mouth horizontally (HF) necessitates the use of the high-above angle of the rays (arrow No. 2). Therefore, the placing of the film in the mouth in this position is contra-indicated when one wishes to make a careful examination for periapical infection.

What I claim is:

1. An angle indicating chart or dial for use in connection with X-ray machines, having angle indications and teeth identifying indicia showing the correct range of angles for inclination of the X-ray tube for any tooth, and means for automatically indicating on said chart or dial the different angles and indicia thereof.

2. An angle indicating chart or dial for use in connection with X-ray machines, having angle indications and teeth identifying indicia showing the correct range of angles for inclination of the X-ray tube for any tooth, and a plumb for automatically indicating on said chart or dial the different angles and indicia thereof.

3. An angle indicating chart or dial for use in connection with X-ray machines, having angle indications and teeth identifying indicia showing the correct range of angles for inclination of the X-ray tube for any tooth, a plumb for automatically indicating on said chart or dial the different angles and indicia thereof, and a settable pointer which may be positioned to point to any angle or indicia on said chart or dial.

4. The combination with the X-ray tube of an X-ray machine, of an angle indicating chart or dial carried by said tube and having angle indications and teeth-identifying indicia showing the correct range of angles for inclination of the X-ray tube for any tooth, and means for automatically indicating on said chart or dial the different angles and indicia thereof as the tube is tilted.

5. The combination with the X-ray tube of an X-ray machine, of an angle indicating chart or dial carried by said tube and having angle indications and teeth identifying indicia showing the correct range of angles for inclination of the X-ray tube for any tooth, and a plumb for automatically indicating on said chart or dial the different angles and indicia thereof as the tube is tilted.

6. The combination with the X-ray tube of an X-ray machine, of an angle indicating chart or dial carried by said tube and having angle indications and teeth identifying indicia showing the correct range of angles for inclination of the X-ray tube for any tooth, a plumb for automatically indicating on said chart or dial the different angles and indicia thereof as the tube is tilted, and a settable pointer which may be positioned to point to any angle or indicia on said chart or dial.

7. The combination with the X-ray tube of an X-ray machine, of an angle indicating chart of semi-disk shape carried by said tube and comprising two quadrants, one quadrant bearing angle inclinations for downward inclination of the X-ray tube and the other quadrant bearing angle inclinations for upward inclination of the X-ray tube, a plumb adapted to automatically show the angle of inclination when the tube is tilted, and a pointer which may be set to point to any angle or indicia on either quadrant.

8. The combination with the X-ray tube of an X-ray machine, of an angle indicating chart or dial carried by said X-ray tube, a plumb adapted to automatically show the angle of inclination of the tube, either upwardly or downwardly from the horizontal, and a settable pointer for indicating any angle on said chart or dial.

In testimony whereof I affix my signature.

HOWARD RILEY RAPER.